US012662615B2

(12) United States Patent
Ye et al.

(10) Patent No.: US 12,662,615 B2
(45) Date of Patent: Jun. 23, 2026

(54) POLYURETHANE HOT MELT ADHESIVE COMPOSITION, AND PREPARATION METHOD THEREOF

(71) Applicant: Henkel AG & Co. KGaA, Duesseldorf (DE)

(72) Inventors: Weihua Ye, Guangdong (CN); Junjun Wu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 298 days.

(21) Appl. No.: 17/806,362

(22) Filed: Jun. 10, 2022

(65) Prior Publication Data

US 2022/0315817 A1     Oct. 6, 2022

Related U.S. Application Data

(63) Continuation of application No. PCT/CN2019/125898, filed on Dec. 17, 2019.

(51) Int. Cl.
| | |
|---|---|
| *C09J 175/06* | (2006.01) |
| *C09J 7/24* | (2018.01) |
| *C09J 7/35* | (2018.01) |
| *C09J 175/08* | (2006.01) |
| *C08K 3/26* | (2006.01) |

(52) U.S. Cl.
CPC ............. *C09J 175/06* (2013.01); *C09J 7/241* (2018.01); *C09J 7/35* (2018.01); *C09J 175/08* (2013.01); *C08K 2003/265* (2013.01); *C09J 2203/326* (2013.01); *C09J 2301/304* (2020.08)

(58) Field of Classification Search
CPC ...... C09J 17/06; C09J 17/08; C08K 2003/365
See application file for complete search history.

(56) References Cited

U.S. PATENT DOCUMENTS

| | | | | |
|---|---|---|---|---|
| 3,305,503 A | * | 2/1967 | Russell | ................... C08L 75/04 |
| | | | | 524/507 |
| 3,928,281 A | | 12/1975 | Uchigaki et al. | |
| 4,049,680 A | * | 9/1977 | Blachford | ............ C10M 169/00 |
| | | | | 554/56 |

| | | | | |
|---|---|---|---|---|
| 5,472,785 A | * | 12/1995 | Stobbie, IV | ....... C08G 18/4238 |
| | | | | 525/440.12 |
| 5,869,593 A | * | 2/1999 | Helmeke | ................. B32B 27/40 |
| | | | | 528/80 |
| 7,612,151 B2 | | 11/2009 | Minamida et al. | |
| 7,834,102 B2 | * | 11/2010 | Zhou | ...................... C08G 18/10 |
| | | | | 528/65 |
| 9,659,832 B2 | | 5/2017 | Giorgini et al. | |
| 10,190,029 B2 | | 1/2019 | Franken et al. | |
| 10,407,596 B2 | | 9/2019 | Morgeneyer et al. | |
| 11,530,344 B2 | | 12/2022 | Xie et al. | |
| 11,732,166 B2 | * | 8/2023 | O'Brien | .................. B32B 27/08 |
| | | | | 525/453 |
| 2004/0180155 A1 | | 9/2004 | Nguyen-Misra et al. | |
| 2005/0215702 A1 | * | 9/2005 | Slark | .................. C08G 18/3831 |
| | | | | 524/589 |
| 2011/0092648 A1 | * | 4/2011 | Lu | ...................... C08G 18/4202 |
| | | | | 525/123 |
| 2016/0215185 A1 | | 7/2016 | Li et al. | |
| 2018/0346775 A1 | | 12/2018 | Schmider et al. | |

FOREIGN PATENT DOCUMENTS

| | | | |
|---|---|---|---|
| CN | 1942548 A | 4/2007 | |
| CN | 101418203 A | 4/2009 | |
| CN | 102977838 A | 3/2013 | |
| CN | 103717688 A | 4/2014 | |
| CN | 106103524 A | 11/2016 | |
| CN | 106536666 A | 3/2017 | |
| CN | 109233731 A | 1/2019 | |
| CN | 109952355 A | 6/2019 | |
| EP | 1734095 A1 | 12/2006 | |
| JP | 2001214145 A | 8/2001 | |
| JP | 2016535121 A | 11/2016 | |
| JP | 2017113656 A | 6/2017 | |

OTHER PUBLICATIONS

International Search Report for International PCT Patent Application No. PCT/CN2019/125898 dated Aug. 21, 2020.

* cited by examiner

*Primary Examiner* — Margaret G Moore
(74) *Attorney, Agent, or Firm* — Sun Hee Thomas

(57)     ABSTRACT

The present invention provides a hotmelt adhesive composition, comprising (A) at least one polyurethane prepolymer obtained by reacting (A1) polyols comprising: (a) at least one polyester polyol, and (b) at least one polyether polyol, with (A2) at least one polyisocyanate having at least two isocyanate groups in one molecule; (B) at least one thermoplastic resin; and (C) at least one aspect ratio promoter in an amount of no more than 10% by weight based on the total weight of the composition.

18 Claims, No Drawings

POLYURETHANE HOT MELT ADHESIVE COMPOSITION, AND PREPARATION METHOD THEREOF

TECHNICAL FIELD

The present invention relates to a polyurethane hot melt adhesive composition, particularly, relates to an aspect ratio promoter-containing polyurethane hot melt adhesive composition, the preparation method and use thereof.

BACKGROUND OF THE INVENTION

Throughout the past few years, many smartphone makers have decided to go the "bigger is better" route in terms of smartphone design. Many companies launched phones with large display screen of 5.5-inch, 5.7-inch, even higher up to 6.4-inches, which was considered by many users to be too big for people to handle. In 2017, smartphone companies camp up with a solution that offer large display without increasing the overall bulk of the phone. That is bezel-less smartphone. Nowadays, not only for smartphones, bezel-less design has been a mainstream in other electronic devices such as a liquid crystal display (LCD), touch panels, tablet computer, etc.

In the production or the like of those bezel-less display devices, the screen unit including a pair of substrates maintains a fixed space by a spacer, and sealant and adhesive extends around the periphery of the inner surface of the glass substrates to form a sandwiched structure. As for the sealant and adhesive, at present, polyurethane hot melt adhesive compositions have been widely used in bonding the substrates for those electronic devices.

Polyurethane hot melt adhesive composition is solid at room temperature, melt to a viscous liquid when heated to a moderate temperature, and applied to substrate to be bonded. The molten adhesive composition then cools and solidifies to form initial bond to the substrate, it can further react with moisture to form crosslinking structure and achieve high final strength. Polyurethane hot melt adhesive composition is environment-friendly, fast curing and has high adhesion and thus are suitable for bonding for various base materials such as PC, PBT, PET, PVC, PMMA, metal and inorganic glass in the electronic devices. However, the bezel-less design of electronic products requires the adhesive to be dispensed into a much thinner bond line than conventional ones for general electronic devices without derogating other properties in terms of adhesiveness, curing time and impact resistance, etc.

Most of the prior art focused on improving the techniques of dispensing equipment to address this problem. There were few specialized in developing adhesive compositions in this regard. For example, CN101418203A discloses that chain extender and filler can greatly improve the viscosity of the adhesive. However, the filler tends to block the needle which affects the fluidity of adhesive dispensing.

Consequently, there remains a need to develop a hot melt adhesive composition which can be dispersed into a thin bond line particularly used for bonding bezel-less electronic products without adversely affecting other important properties such as the adhesion strength.

SUMMARY OF THE INVENTION

After intensive studies, the inventors have found that the above problems can be solved by a polyurethane hot melt adhesive composition comprising:

(A) at least one polyurethane prepolymer obtained by reacting (A1) polyols comprising:

(a) at least one polyester polyol, and (b) at least one polyether polyol, with (A2) at least one polyisocyanate having at least two isocyanate groups in one molecule;

(B) at least one thermoplastic resin; and (C) at least one aspect ratio promoter in an amount of no more than 10% by weight, based on the total weight of the composition.

In another aspect of the invention, provided is a method for preparing a polyurethane hot melt adhesive composition of the present invention.

In an additional aspect of the present invention, provided is a laminate comprising a first substrate, a second substrate, and an adhesive layer sandwiched therebetween, wherein the first and second substrates are independently of each other selected from a glass, a resin, a metal and a polyolefin, and the adhesive layer being formed by curing the adhesive composition of the present invention.

In yet another aspect of the invention, provided is the use of the adhesive composition and the laminate of the present invention in a touch screen, a cellphone, a liquid crystal display, a polymer panel, a film, a conductive layer, a protective layer, or an ink layer.

The present invention features a polyurethane hot melt adhesive composition that exhibits a high aspect ratio, and hence is particularly used for bonding bezel-less electronic products. Furthermore, the adhesive composition has excellent adhesion and bonding strength, and can be easy applied with dispensing and jetting machine.

DETAILED DESCRIPTION OF THE INVENTION

It is to be understood by one of ordinary skill in the art that the present invention is a description of exemplary embodiments only and is not intended as limiting the broader aspects of the present invention. Each aspect so described may be combined with any other aspect or aspects unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

Unless specified otherwise, the recitation of numerical end points includes all numbers and fractions subsumed within the respective ranges, as well as the recited end points.

The molecular weights refer to number average molecular weights (Mn), unless otherwise stipulated. All molecular weight data refer to values obtained by gel permeation chromatography (GPC), unless otherwise stipulated, e.g., according to DIN 55672.

All references cited in the present specification are hereby incorporated by reference in their entirety.

Unless otherwise defined, all terms used in the present invention, including technical and scientific terms, have the meaning as commonly understood by one of the ordinary skilled in the art to which the present invention belongs.

The present invention is directed to a polyurethane hot melt adhesive composition comprising:

(A) at least one polyurethane prepolymer obtained by reacting (A1) polyols comprising:

(a) at least one polyester polyol, and (b) at least one polyether polyol, with (A2) at least one polyisocyanate having at least two isocyanate groups in one molecule;

(B) at least one thermoplastic resin; and (C) at least one aspect ratio promoter in an amount of no more than 10% by weight, based on the total weight of the composition.

(A) Polyurethane Prepolymer

The polyurethane hot melt adhesive composition comprises at least one polyurethane prepolymer having at least two isocyanate group in one molecule. The polyurethane prepolymer is obtained by reacting two or more polyols and at least one polyisocyanate having at least two isocyanate groups in one molecule. In one embodiment, the amount of the isocyanate-functional polyurethane prepolymer in the hot melt adhesive of the present invention is from about 60 to about 99.9% by weight, preferably from about 65 to about 95% by weight, based on the total weight of reactive hot melt adhesive.

In other embodiments, the polyurethane prepolymer has a number average molecular weight of from 5,000 to 30,000 g/mol, preferably from 8,000 to 15,000 g/mol, and more preferably from 8,500 to 10,000 g/mol.

(A1) Polyols

According to the present invention, the said polyols comprise (a) at least one polyester polyol, and (b) at least one polyether polyol.

(a) Polyester Polyol

The polyester polyol used in the present invention can be crystalline polyester polyol, amorphous polyester polyol, or mixture thereof.

In some embodiments, polyester polyol can be selected from crystalline polyester polyol having a melting point of more than 40° C., amorphous polyester polyol having a glass transition temperature of more than 0° C., liquid polyester polyol having a glass transition temperature of no larger than 0° C., and mixture thereof.

The crystalline polyester polyols in the present invention to offer good adhesion strength to the adhesive composition. In preferred embodiments, the crystalline polyester polyol has a melting point of more than 40° C., more preferably from 40° C. to 110° C., even more preferably from 50° C. to 100° C. If the crystalline melting point is too low, the cohesive strength of formed polyurethane hot melt adhesive is too weak. If the crystalline melting point is too high, the open time of formed polyurethane hot melt adhesive is too short and difficult to operate in production, in addition, it may easily cause the adhesive product to separate from the wall of the tube package.

In preferred embodiments, the polyester polyol has a number average molecular weight of from 1,000 to 20,000 g/mol, preferably from 2,000 to 15,000 g/mol, and more preferably from 2,000 to 8,000 g/mol.

Examples of such crystalline polyester polyols can be obtained by ring opening polymerization of a lactone such as ε-caprolactone and/or be derived from diols and diacids. Examples of diols useful in preparing preferred polyester polyols include ethylene glycol, diethylene glycol, 1,3-propylene glycol, 1,4-butanediol, 1,5-pentanediol, 1,6-hexanediol, 1,8-octanediol, 1,10-decanediol, and mixtures thereof. Examples of diacids useful in preparing preferred polyester polyols include succinic acid, glutaric acid, adipic acid, suberic acid, azelaic acid, sebacic acid, and 1,12-dodecanedioic acid, dimer acid, and mixtures thereof. Included within the scope of useful diacids are various diacid derivatives such as carboxylate esters (especially the methyl and ethyl esters), acid halides (such as acid chlorides) and acid anhydrides, and mixtures thereof.

Specific examples of suitable crystalline polyester polyols include poly(hexanediol adipate) polyol, poly(butanediol adipate) polyol, poly-epsilon-caprolactone polyol, poly(hexanediol dodecanedioate) polyol, poly(hexanediol adipic acid terephthalate) polyol, and mixture thereof.

Suitable commercially available crystalline polyester polyols are sold under the DYNACOLL® 7300 series of trade designations from Evonik Industries AG (Germany) including DYNACOLL® 7360, 7361, 7362, 7363, 7380, 7390 etc.; and under the CAPA™ series of trade designations from Perstorp Polyols Inc. including CAPA™ 2201, 2205, 2209, 2302, 2304, 2402 etc. caprolactone polyols.

The amorphous polyester polyols used in this present invention preferably having a glass transition temperature of more than 0° C.

The amorphous polyester polyol includes the reaction product of a polyacid component (e.g., polyacid, polyacid anhydride, polyacid ester and polyacid halide), and a stoichiometric excess of polyol. At least one of the polyacid component and the polyol includes an aromatic group. Suitable polyacids include, e.g., diacids (e.g., dicarboxylic acids), triacids (e.g., tricarboxylic acids), and higher order acids, examples of which include aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butanetricarboxylic acid, decanedicarboxylic acid, octadecanedicarboxylic acid, dimeric acid, dimerized fatty acids, trimeric fatty acids, and fumaric acid), and alicyclic dicarboxylic acids (e.g. 1,3-cyclohexanedicarboxylic acid, and 1,4-cyclohexanedicarboxylic acid), and mixture thereof.

Examples of suitable polyols include aliphatic polyols, e.g., ethylene glycols, propane diols (e.g., 1,2-propanediol and 1,3-propanediol), butane diols (e.g., 1,3-butanediol, 1,4-butanediol, and 1,2-butanediol), 1,3-butenediol, 1,4-butenediol, 1,4-butynediol, pentane diols (e.g., 1,5-pentanediol), pentenediols, pentynediols, 1,6-hexanediol, 1,8octanediol, 1, 10-decanediol, neopentyl glycol, diethylene glycol, triethylene glycol, tetraethylene glycol, polyethylene glycols, propylene glycol, polypropylene glycols (e.g., dipropylene glycol and tripropylene glycol), 1,4-cyclohexanedimethanol, 1,4-cyclohexanediol, dimer diols, bis-phenol A, bisphenol F, hydrogenated bisphenol A, hydrogenated bisphenol F, glycerol, tetramethylene glycol, polytetramethylene glycol, 3-methyl-1,5-pentanediol, 1,9-nonanediol, 2-methyl-i,8-octanediol, trimethylolpropane, pentaerythritol, sorbitol, glucose, and combinations thereof.

Specific examples of useful amorphous polyester polyols include poly(hexanediol phthalate) polyol, poly(neopentyl glycol adipate) polyol, poly(neopentyl glycol phthalate) polyol, poly(neopentyl glycol hexanediol phthalate) polyol, poly(diethylene glycol phthalate) polyol, poly(ethylene glycol adipic acid terephthalate) polyol, polyethylene terephthalate polyols, random copolymer diols of ethylene glycol, hexane diol, neopentyl glycol, adipic acid and terephthalic acid, and combinations thereof.

Useful amorphous polyester polyols are commercially available under a variety of trade designations including, e.g., DYNACOLL 7210, 7230, and 7231 from Evonik Industries AG (Germany), STEPANPOL PH56 and PD56 from Stepan Company (Northfield, Ill.), and PIOTHANE 500 HP, 1000 HP, and 2000 HP from Panolam Industries Intl, Inc. (Auburn, Me.).

In preferred embodiments, the polyester polyols used in this invention can be liquid at room temperature, which provides wetting properties to the adhesive composition and impact resistance to the cured product. Accordingly, the liquid polyester polyol has a glass transition temperature (Tg) of no larger than 0° C., preferably from –100° C. to 0° C., more preferably from –50° C. to 0° C. If the Tg of the liquid polyester polyol is too high, it is more difficult to be in liquid status.

Examples of liquid polyester polyols can be obtained by ring opening polymerization of a lactone such as ε-caprolactone and/or be derived from diols and diacids. Examples of diols useful in preparing preferred polyester polyols include ethylene glycol, diethylene glycol, 1,3-propylene glycol, 1,4-butanediol, 1,5-pentanediol, 1,6-hexanediol, 1,8-octanediol, 1,10-decanediol, and mixtures thereof. Examples of diacids useful in preparing preferred polyester polyols include succinic acid, glutaric acid, adipic acid, suberic acid, azelaic acid, sebacic acid, and 1,12-dodecanedioic acid, dimer acid, and mixtures thereof. Included within the scope of useful diacids are various diacid derivatives such as carboxylate esters (especially the methyl and ethyl esters), acid halides (such as acid chlorides) and acid anhydrides, and mixtures thereof.

Specific examples of suitable liquid polyester polyols include poly(hexanediol adipate) polyol, poly(butanediol adipate) polyol, poly-epsilon-caprolactone polyol, poly(hexanediol dodecanedioate) polyol, poly(hexanediol adipic acid terephthalate) polyol, and mixture thereof.

Suitable commercially available liquid polyester polyols are sold under the DYNACOLL® 7200 series of trade designations from Evonik Industries AG (Germany) including DYNACOLL® 7210, 7230, 7231, 7250, 7255, etc.

With particular preference, the polyester polyol can be incorporated into the adhesive composition according to the present invention in an amount of from 5% to 55% by weight, and preferably from 20% to 45% by weight, based on the total weight of the composition.

(b) Polyether Polyol

According to the present invention, the said polyols used in the present invention also comprise at least one polyether polyol.

The polyether polyols used in the present invention are well known to those skilled in the art. These polyether polyols are obtained by copolymerizing at least one compound of ethylene oxide, propylene oxide, butylene oxide, tetrahydrofuran, etc. with at least one compound having at least two active hydrogen atoms on average in one molecule such as the polyhydric alcohols list above which include ethylene glycol, propylene glycol, dipropylene glycol, glycerol, and mixtures thereof. Other suitable polyhydric compounds include sucrose, ethylenediamine, propylenediamine, triethanolamine, 1,2-propanedithiol, and mixtures thereof.

Preferably, the polyether polyols have a glass transition temperature no larger than 0° C., preferably from –100 to 0° C., and more preferably from –50 to 0° C. Particularly preferred polyether polyols can be polytetramethylene ether glycol, poly(oxypropylene) glycol, polyethylene oxide, polybuthylene oxide, and ethylene oxide endcapped versions of any of the foregoing. The most preferred polyether polyols are polytetramethylene ether glycol, poly(oxypropylene) glycol, and ethylene oxide endcapped poly(oxypropylene)glycol.

In preferred embodiments, the polyether polyol has a number average molecular weight of from 400 to 8,000 g/mol, preferably from 500 to 5,000 g/mol, and more preferably from 1,000 to 4,000 g/mol.

It is possible to use commercially available products in the present invention. Examples thereof include Voranol™ 2104, 2110, 2120, 2140 from Dow Chemical Company.

With particular preference, the polyether polyol can be incorporated in an amount of from 15% to 45% by weight, and more preferably from 15% to 40% by weight, based on the total weight of the composition.

(A2) Polyisocyanate

The polyurethane hot melt adhesive composition comprises at least one polyurethane prepolymer obtained by reacting (A1) polyols with (A2) at least one polyisocyanate having at least two isocyanate groups in one molecule.

Useful polyisocyanate include any suitable isocyanate having at least two isocyanate groups in one molecule including, e.g., aliphatic, cyclopaliphatic, araliphatic, arylalkyl, and aromatic isocyanates, and mixtures thereof.

Preferable polyisocyanate can be selected from 4,4-diphenylmethane diisocyanate (MDI), hydrogenated MDI (H12MDI), partly hydrogenated MDI (H6MDI), xylylene diisocyanate (XDI), tetramethylxylylene diisocyanate (TMXDI), 4,4-diphenyldimethylmethane diisocyanate, dialkylenediphenylmethane diisocyanate, tetraalkylenediphenylmethane diisocyanate, 4,4-dibenzyl diisocyanate, 1,3-phenylene diisocyanate, 1,4-phenylene diisocyanate, the isomers of toluylene diisocyanate (TDI), 1-methyl-2,4-diisocyanatocyclohexane, 1,6-diisocyanato-2,2,4-trimethyl-hexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, naphthalene-1,5-diisocyanate (NDI), butane-1,4-diisocyanate, hexane-1,6-diisocyanate (HDI), dicyclohexylmethane diisocyanate, 2,2,4-trimethylhexane-2,3,3-trimethylhexamethylene diisocyanate, cyclohexane-1,4-diisocyanate, ethylene diisocyanate, methylenetriphenyltriisocyanate (MIT), phthalic acid bisisocyanatoethyl ester, trimethylhexamethylene diisocyanate, 1,4-diisocyanatobutane, 1,12-diisocyanatododecane, and dimer fatty acid diisocyanate, lysine ester diisocyanate, 4,4-dicyclohexylmethane diisocyanate, 1,3-cyclohexane or 1,4-cyclohexane diisocyanate, and mixtures thereof. The most preferred polyisocyanate is 4,4-diphenylmethane diisocyanate (MDI) and its isomers, chain-extended MDI, and mixtures thereof.

Useful commercially available polyisocyanate includes MONDUR ML® from Covestro, ISONATE™ 50 OP and ISONATE™ 125M from Dow Chemical Company and Desmodur® 44C available from Covestro Polymers (China) Co., Ltd.

With particular preference, the polyisocyanate can be incorporated in the adhesive composition in an amount of from 10% to 25% by weight, and preferably from 10% to 20% by weight, based on the total weight of the composition.

(B) Thermoplastic Resin

The adhesive composition according to the present invention further comprises at least one thermoplastic resin to provide the adhesive composition with high strength.

For purposes of this invention, a thermoplastic resin is distinct from a thermosetting resin which solidifies via crosslinking or curing when subjected to heat and/or to a suitable curing agent. The thermoplastic resin described herein includes any non-reactive thermoplastic resin preferably essentially free of unreacted and monomeric isocyanates.

Suitable thermoplastic resin can be selected from polyesters, phenoxy resins, phenolic resins, acrylic polymers, acrylic block copolymers, acrylic polymers having tertiary-alkyl amide functionality, polysiloxane polymers, polystyrene copolymers, polyvinyl polymers, divinylbenzene copolymers, polyetheramides, polyvinyl acetals, polyvinyl butyrals, polyvinyl acetols, polyvinyl alcohols, polyvinyl acetates, polyvinyl chlorides, methylene polyvinyl ethers, cellulose acetates, styrene acrylonitriles, amorphous polyolefins, thermoplastic urethanes, polyacrylonitriles, ethylene vinyl acetate copolymers, ethylene vinyl acetate terpolymers, functional ethylene vinyl acetates, ethylene acrylate copolymers, ethylene acrylate terpolymers, ethylene butadiene copolymers and/or block copolymers, styrene butadiene block copolymers, polycaprolactone, and mixture thereof.

In preferred embodiments, the thermoplastic resin has a number average molecular weight of from 8,000 to 100,000 g/mol, preferably from 8,000 to 80,000 g/mol, and more preferably from 20,000 to 50,000 g/mol.

With particular preference, the thermoplastic resin is present in the adhesive composition in an amount of from 5% to 30% by weight, and preferably from 5% to 20% by weight, based on the total weight of the composition.

(C) Aspect Ratio Promoter

The hot melt adhesive composition also comprises at least one aspect ratio promoter in an amount of no more than 10% by weight based on the total weight of the composition.

Preferably, the aspect ratio promoter can be selected from wax, calcium carbonate, talc, fumed silica, carbon black, and mixture thereof.

Wax

Waxes are frequently classified according to the source from which they are derived. Thus, waxes may be of either natural or synthetic origin and both classes are useful in the hot melt adhesive compositions of the invention. Natural waxes include those derived from insects, animals, plants, minerals and petroleum. Petroleum waxes are conventionally subdivided into paraffin waxes and microcrystalline waxes, these inherently nonreactive waxes being obtained at different stages in the process of refining crude oil.

On the other hand, synthetic waxes are regarded as waxes because they tend to possess physical properties like natural waxes. Synthetic waxes are predominantly derived from the polymerization of hydrocarbon monomers such as ethylene, propylene, and the like and have molecular weights below 10,000 g/mol. Synthetic waxes can be made by various approaches including high pressure polymerization, low pressure polymerization using Ziegler-Natta type catalysts, or the thermal degradation of high molecular weight polymers such as polyethylene and polypropylene. Synthetic waxes include polyethylene waxes, Fischer-Tropsch waxes (polymethylene waxes), and chemically modified hydrocarbon waxes (i.e., microcrystalline, polyethylene and polymethylene waxes that have been chemically modified to introduce particular properties).

Preferably, the wax comprised in said composition is selected from the group consisting of paraffin wax, microcrystalline wax, polyethylene wax, polypropylene wax, by-product polyethylene wax, sasol wax, Fischer-Tropsch synthetic wax, various modified wax and functionalized wax. The wax can be used alone or used in combination of two or more of the waxes.

In preferred embodiments, the wax has a melting point of from 80° C. to 200° C., and preferably from 100° C. to 150° C.

Suitable commercially available waxes include Sasolwax H1, H8, etc. from Sasol Wax (South Africa) Pty. Ltd, and Luvotix LT1, LT10, etc. from Lehmann & Voss & Co (Germany).

Calcium Carbonate

In a preferred embodiment, the adhesive composition comprises calcium carbonate as the aspect ratio promoter.

Calcium carbonate is a chemical compound with the formula $CaCO_3$. It is a common substance found in rocks as the minerals calcite and aragonite (most notably as limestone, which is a type of sedimentary rock consisting mainly of calcite) and is the main component of pearls and the shells of marine organisms, snails, and eggs. Calcium carbonate can offer good viscosity or rheology stability and weathering together with good adhesion properties to the adhesive composition described herein.

Examples of commercial calcium carbonate products are SOCAL® 321 under Solvay.

Talc

In a preferred embodiment, the adhesive composition comprises talc as the aspect ratio promoter.

Talc is a well-known mineral with its main component as hydrated magnesium silicate and it, as well as compounds containing predominantly talc are commercially available.

All talc modifications, preferably talc in particulate form, are suitable. Mineral substances which have a content of talc of greater than 50 wt %, preferably greater than 80 wt %, particularly preferably greater than 95 wt %, based on the total weight of the substance, are preferred. The talc used may also be treated on the surface. Thus, it may be treated with a suitable size system which comprises, for example, an adhesion promoter or an adhesion promoter system e.g. based on silane. Examples of commercial talcum products are Finntalc C 10, Finntalc M 03, Finntalc M05 and Finntalc M20SLE from Mondo Minerals (Helsinki, Finland), HiTalc HTP Ultra 5C from HiTalc Marketing & Technology GmbH (Graz, Austria), Luzenac 1445 and Luzenac 10MOOS from Luzenac (Neuilly, France), Naintsch A 60 and Naintsch A10 from Naintsch Mineralwerke GmbH (Graz, Austria), Microtalc IT Extra, Mistron Vapor and Mistron Vapor RP-6 from Luzenac America (Englewood, USA), Steamic OOS from Brenntag N. V. (Deerlijik, Belgium) and Tital 5 from Incemin A G (Holderbank, Switzerland).

The incorporation of a proper minor amount of the aspect ratio promoter dramatically increases the aspect ratio defined herein while remaining a good tensile strength for the hot melt adhesive. The aspect ratio promoter should be used in an effective amount. That is, the amount causes a meaningful increase in aspect ratio but not in an amount so great that other properties such as the adhesion strength or the dispensability are materially adversely affected. If the aspect ratio promoter content is too low, the increase in aspect ratio may not be sufficient for the intended application. On the other hand, increasingly larger amounts of aspect ratio promoter may affect other properties of the hot melt adhesive. Therefore, the aspect ratio promoter should be comprised in the adhesive composition in an amount of no more than 10% by weight, preferably no more than 5% by weight, more preferably from 0.01 to 10% by weight, and even more preferably from 0.05 to 5% by weight, in particular from 0.1 to 3% by weight, based on the total weight of the composition.

(D) Catalyst

Preferably, the composition may also comprise a catalyst to facilitate the reaction between the polyol and polyisocyanate.

Catalysts typically used in the production of polyurethanes in this way include, for example, strongly basic amides, such as 2,3-dimethyl-3,4,5,6-tetrahydropyrimidine, tris-(dialkylaminoalkyl)-s-hexahydrotriazines, for example tris-(N,N-dimethylaminopropyl)-s-hexahydrotriazine or the usual tertiary amines, for example triethylamine, tributylamine, dimethylbenzylamine, N-ethyl-, N-methyl-, N-cyclohexylmorpholine, dimethylcyclohexylamine, dimorpholinodiethylether, 2-(dimethylaminoethoxy)-ethanol, 1,4diazabicyclo[2,2,2]octane, 1-azabicyclo[3,3,0]octane, N,N, N',N'-tetramethyl ethylenediamine, N,N,N',N'-tetramethyl butanediamine, N,N,N',N'-tetramethyl hexanel,6-diamine, pentamethyl diethylenetriamine, tetramethyl diaminoethylether, bis-(dimethylaminopropyl)-urea, N,N'-dimethylpiperazine, 1,2-dimethylimidazole, di-(4-N,N-dimethylaminocyclohexyl)-methane and the like and organometallic compounds, such as titanic acid esters, iron compounds, for example iron(III) acetyl acetonate, tin compounds, for example tin(II) salts of organic carboxylic acids, for example tin(II) diacetate, the tin(II) salt of 2-ethylhexanoic acid (tin(II) octoate), tin(II) dilaurate or the dialkyltin(IV) salts of organic carboxylic acids, for example dibutyltin(IV) diacetate, dibutyltin(IV) dilaurate, dibutyltin (IV) maleate or dioctyltin(IV) diacetate or the like, and dibutyltin(IV) dimercaptide or mixtures of two or more of the catalysts mentioned and synergistic combinations of strongly basic amines and organometallic compounds.

With particular preference, the catalyst is present in the adhesive composition in an amount of from 0.05% to 1% by weight, and preferably from 0.05% to 0.5% by weight, based on the total weight of the composition.

Other Components

Other additives may be added to the hot melt adhesive compositions. Such additives can be those commonly used in the art, such as colorants, antioxidants, etc.

Examples of colorants include pigments which may be selected from metal oxide pigments, titanium dioxide, optionally surface-treated, zirconium oxide or cerium oxide, zinc oxide, iron oxide (black, yellow or red), chromium oxide, manganese.

Examples of antioxidants include phenolic types such as BHT (butylated hydroxytoluene), octadecyl-3,5-bis(1,1dimethyl)-4-hydroxybenzene-propanoate, and pyrogallol; phosphites such as triphenyl phosphite, tris(nonylphenyl) phosphite; or thioesters such as dilauryl thiodipropionate.

In preferred embodiments, the present invention provides a polyurethane hot melt adhesive composition, comprising, based on the total weight of the composition:

(A) from 5 to 55%, preferably from 20 to 45% by weight of at least one polyester polyol;

(B) from 15 to 45%, preferably from 15 to 40% by weight of at least one polyether polyol;

(C) from 10 to 25%, preferably from 10 to 20% by weight of at least one polyisocyanate;

(D) from 5 to 30%, preferably from 5 to 20% by weight of at least one thermoplastic resin; and (E) no more than 10%, preferably from 0.01 to 8% by weight of at least one aspect ratio promoter.

In preferred embodiments, the present invention provides a polyurethane hot melt adhesive composition, comprising, based on the total weight of the composition:

(A) from 5 to 55%, preferably from 20 to 45% by weight of at least one polyester polyol;

(B) from 15 to 45%, preferably from 15 to 40% by weight of at least one polyether polyol;

(C) from 10 to 25%, preferably from 10 to 20% by weight of at least one polyisocyanate;

(D) from 5 to 30%, preferably from 5 to 20% by weight of at least one thermoplastic resin; and (E) no more than 10%, preferably from 0.01 to 10% by weight of at least one aspect ratio promoter; and (F) from 0.05 to 1%, preferably from 0.05 to 0.5% by weight of at least one catalyst.

The method of preparing a polyurethane hot melt adhesive composition comprises the following steps:

i. Mixing the polyols, thermoplastic resin and aspect ratio promoter under the nitrogen protection at the temperature from 130 to 150° C. and then vacuuming;

ii. Decreasing the reaction temperature and adding polyisocyanate at the temperature from 80 to 120° C., and then controlling at the temperature from 100 to 120° C.;

iii. Adding catalyst and optional additives to mix to homogeneity; and iv. Discharging the mixture under nitrogen protection at the temperature from 100 to 150° C.

The polyurethane hot melt adhesive composition of the invention may be readily manufactured using other conventional production techniques.

In one embodiment, the adhesive composition exhibits an aspect ratio of no less than 50%, and preferably no less than 60% when cured.

In another embodiment, the adhesive composition exhibits a tensile strength of larger than 2.0 MPa, and preferably larger than 3.5 MPa when cured.

In an additional aspect of the invention, a laminate comprising a first substrate, a second substrate, and an adhesive layer sandwiched therebetween, wherein the first and second substrates are independently of each other selected from a glass, a resin, a metal and a polyolefin, and the adhesive layer being formed by curing the adhesive composition of the present invention is provided.

In some embodiments, the adhesive composition is used to bond at least one panel of substrate with a structural support, e.g., a spacer which is to provide a thickness between the substrate pairs. Spacers contemplated for use in the present invention can be any of a variety of shapes, e.g., spherical, imperfect spheres, non-spherical, solid, hollow, and the like. The substrates can be selected from a glass, a resin, a metal and a polyolefin.

In yet another aspect of the invention relates to the use of the adhesive composition in a touch screen, a cellphone, a liquid crystal display, a polymer panel, a film, a conductive layer, a protective layer, or an ink layer.

EXAMPLES

The following examples are intended to assist one skilled in the art to better understand and practice the present invention. The scope of the invention is not limited by the examples but is defined in the appended claims. All parts and percentages are based on weight unless otherwise stated.

Raw Materials:

Dynacoll® 7360 is crystalline polyester polyol having a number average molecular weight of 3500 g/mol and melting point of 55° C., available from Evonik Industries AG.

Dynacoll® 7361 is crystalline polyester polyol having a number average molecular weight of 8500 g/mol and melting point of 57° C., available from Evonik Industries AG.

Dynacoll® 7231 is liquid polyester polyol having a number average molecular weight of 3500 g/mol and glass transition temperature of −30° C., available from Evonik Industries AG.

Dynacoll® 7250 is liquid polyester polyol having a number average molecular weight of 5500 g/mol and glass transition temperature of −50° C., available from Evonik Industries AG.

Voranol™ 2120 is a polyether polyol having a number average molecular weight of 2000 g/mol, available from Dow Chemical Company.

PolyTHF® 2000 is a polytetrahydrofuran polyol having a number average molecular weight of 2000 g/mol, available from BASF.

Desmodur® 44C is a monomeric diphenylmethane-4,4'-diisocyanate, available from Covestro Polymers (China) Co., Ltd.

Elvacite® 2013 is a polyacrylic based thermoplastic resin having a number average molecular weight of 34,000 g/mol and a glass transition temperature of 76° C., available from Lucite International.

Sasolwax H1 is a Fischer-Tropsch wax has a melting point of 112° C., available from Sasol Wax (South Africa) Pty. Ltd.

Luvotix® LT10 is a polyamide wax has a melting point of 130° C., available from Lehmann & Voss.

Finntalc M03 is talc available from Mondo Minerals.

SOCAL® 321 is an ultrafine surface treated precipitated calcium carbonate available from Solvay.

JEFFCAT® DMDEE is catalyst of 2,2'-dimorpholinildiethylether, available from HUNTSMAN.

Test Methods:

Aspect Ratio:

The present invention provides a novel means of evaluating the shape of the bond line of the adhesive. The method utilizes an indicator "Aspect Ratio", defined by width and the height of the bond line of the adhesive as below:

$$\text{Aspect Ratio} = \frac{\text{Height of the bond line}}{\text{Width of the bond line}} \times 100\%$$

The higher of the Aspect Ratio of the adhesive, the thinner of the adhesive bond line and hence is more particularly used for bezel-less electronic products.

Specifically, the aspect ratio was measured by the following steps:

i. The adhesive composition of the invention was heated in Loctite 400D dispenser machine (from Henkel) at 110° C. for 30 min;

ii. A needle of 21# size was used for dispensing. One adhesive bond line with a width of 0.4 mm without pressed was applied to a polycarbonate substrate with 20% by weight of glass fiber;

iii. After 4 min, the width and the height of the adhesive bond line were measured by a 3D Vision measuring machine (Mitutoyo); and iv. The aspect ratio was calculated by the formula defined above.

If the aspect ratio is larger than 50%, the adhesive composition is suitable for the use in the electronic devices having bezel-less design.

Cross Tensile Strength:

Sample Preparation:

i. Firstly, polycarbonate substrates with 20% by weight of glass fiber which in a size of 101.6×25.4×1 mm and an ink glass which in size of 101.6*25.4*3 mm were prepared. The substrates were cleaned with isopropanol and idled at ambient conditions for several minutes to make sure the surface was completely dry. The first substrate and the second substrate were placed crosswise and the overlapping area was to be formed an adhesive layer sandwiched therebetween.

ii. Then, two spacers with diameter of 0.127 mm were set up to control the thickness of the adhesive layer. Before dispersing the adhesive composition, the said spacers were placed at the edge of the first substrate with a distance of 3 mm from the edge of the overlapping area.

iii. After that, the adhesive composition was heated in Loctite 400D dispense machine to 110° C. for 30 minutes. A needle in 21# size was used for dispensing the adhesive composition to the surface of ink glass. During the dispensing process, two bond line was formed by adhesive beads dispensed through the needle. The two bond lines were applied parallelly and each one had a distance of from 1.5 to 1.8 mm to the edge of the overlapping area of the two substrates. Furthermore, the distance between each adhesive bead were controlled at 8 mm, and the distance from the adhesive bead to the edge of the overlapping area of the two substrates was also 8 mm.

iv. After dispensing, the polycarbonate substrates with 20% by weight of glass fiber were pressed on it to form a sandwich construction of the overlapping area while leaving two free ends of each substrate. Then the laminate was prepared.

v. A 2-kilogram weight was applied to the sandwich construction of the overlapping area for 15 seconds. Then the weight was removed, and the resulting samples were placed at 23° C. and 50% relative humidity for 24 hours to cure the adhesive composition.

Sample Testing:

To determine the tensile strength at break of an adhesive layer, the cross tensile strength of the samples was measured by INSTRON tensile tester with a test speed of 10 mm/min. The load at failure and failure mode were recorded accordingly. If the tensile strength is larger than 3 MPa, the adhesive composition is suitable for the use in the electronic devices having bezel-less design.

Examples 1 to 13 (Ex. 1 to Ex. 13) and
Comparative Examples 1 to 4 (CE. 1 to CE. 4)

Adhesives were prepared with the following method using components in amounts (parts by weight) listed in the Table 1, and the properties were tested using the methods stated above, and the results of evaluations are shown in Table 1.

The method of preparing the polyurethane hot melt adhesive compositions comprises the following steps:

i. Mixing the polyols, thermoplastic resin and aspect ratio promoter under the nitrogen protection at the temperature from 130 to 150° C. and then vacuuming;

ii. Decreasing the reaction temperature and adding polyisocyanate at the temperature from 80 to 120° C., and then controlling at the temperature from 100 to 120° C.;

iii. Adding catalyst and optional additives to mix to homogeneity; and iv. Discharging the mixture under nitrogen protection at the temperature from 100 to 150° C.

14

(A2) from 10 wt. % to 20 wt. % of at least one polyisocyanate having at least two isocyanate groups in one molecule;

(B) from 5 wt. % to 20 wt. % of at least one thermoplastic resin; and (C) 3 wt. % of calcium carbonate.

TABLE 1

| Components | CE. 1 | CE. 2 | CE. 3 | CE. 4 |
|---|---|---|---|---|
| Dynacoll ® 7360 | 15.23 | 15.16 | 19.98 | — |
| Dynacoll ® 7361 | — | — | — | 15.00 |
| Dynacoll ® 7231 | — | — | — | 20.01 |
| Dynacoll ® 7250 | 15.23 | 20.21 | 24.98 | — |
| Voranol ™ 2120 | 40.62 | 40.42 | — | 40.01 |
| PolyTHF ® 2000 | — | — | 39.96 | — |
| Desmodur ® 44C | 13.59 | 14.00 | 14.98 | 14.87 |
| Elvacite ® 2013 | 15.23 | 10.11 | — | 10.00 |
| Sasolwax H1 | — | — | — | — |
| Luvotix ® LT10 | — | — | — | — |
| JEFFCAT ® DMDEE | 0.10 | 0.10 | 0.10 | 0.10 |
| Test Results | | | | |
| Aspect Ratio | 50% | 40% | 50% | 35% |
| Tensile Strength (MPa) | 6.0 | 6.1 | 8.3 | 6.6 |

| Components | Ex. 1 | Ex. 2 | Ex. 3 | Ex. 4 | Ex. 5 | Ex. 6 | Ex. 8 | Ex. 9 | Ex. 10 | Ex. 11 | Ex. 12 | Ex. 13 |
|---|---|---|---|---|---|---|---|---|---|---|---|---|
| Dynacoll ® 7360 | 15.20 | 15.15 | 15.14 | 15.01 | 19.98 | 19.98 | — | — | 15.00 | 15.00 | 15.00 | 15.00 |
| Dynacoll ® 7361 | — | — | — | — | — | — | 15.00 | 15.00 | — | — | — | — |
| Dynacoll ® 7231 | — | — | — | — | — | — | 20.01 | 20.01 | — | — | — | — |
| Dynacoll ® 7250 | 15.20 | 15.15 | 20.19 | 20.01 | 24.98 | 24.98 | — | — | 15.00 | 15.00 | 15.00 | 15.00 |
| Voranol ™ 2120 | 40.54 | 40.41 | 40.38 | 40.02 | — | — | 39.71 | 39.71 | 39.93 | 38.73 | 38.73 | 33.21 |
| PolyTHF ® 2000 | — | — | — | — | 39.86 | 38.76 | — | — | — | — | — | — |
| Desmodur ® 44C | 13.56 | 13.52 | 13.98 | 13.86 | 14.98 | 14.98 | 14.87 | 14.87 | 13.37 | 13.07 | 13.07 | 11.69 |
| Elvacite ® 2013 | 15.20 | 15.15 | 10.10 | 10.01 | — | — | 10.00 | 10.00 | 15.00 | 15.00 | 15.00 | 15.00 |
| Sasolwax H1 | 0.20 | 0.50 | — | — | 0.10 | 0.60 | 0.10 | 0.30 | — | — | — | 10.00 |
| Luvotix ® LT10 | — | — | 0.10 | 1.00 | — | 0.60 | — | — | — | — | — | — |
| Finntalc M03 | — | — | — | — | — | — | — | — | 1.5 | 3.0 | — | — |
| SOCAL ® 321 | — | — | — | — | — | — | — | — | — | — | 3.0 | — |
| JEFFCAT ® DMDEE | 0.1 | 0.1 | 0.1 | 0.1 | 0.1 | 0.1 | 0.1 | 0.1 | 0.2 | 0.2 | 0.2 | 0.10 |
| Test Results | | | | | | | | | | | | |
| Aspect Ratio | 80% | 82% | 60% | 81% | 68% | 89% | 56% | 74% | 92.6% | 97.8% | 84% | 110% |
| Tensile Strength (MPa) | 3.9 | 5.2 | 5.3 | 4.5 | 8.0 | 7.2 | 6.5 | 6.2 | 4.35 | 4.37 | 5.5 | 2.4 |

As can be seen from Table 1, the hot melt adhesive compositions in the inventive examples, when cured, exhibited a higher aspect ratio and maintained high tensile strength as well compared to the comparative examples.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A polyurethane hot melt adhesive composition, comprising, based on the total weight of the composition:

(A) at least one polyurethane prepolymer obtained by reacting:

(A1) a polyol component comprising:

(a) from 15 wt. % to 20 wt. % of at least one crystalline polyester polyol, (b) from 15 wt. % to 25 wt. % of at least one liquid polyester polyol, and (c) from 15 wt. % to 40 wt. % of at least one polyether polyol; and 2. The composition of claim 1, wherein the crystalline polyester polyol has a melting point of more than 40° C., and the liquid polyester polyol has a glass transition temperature of no greater than 0° C.

3. The composition of claim 1, wherein the at least one thermoplastic resin is selected from the group consisting of polyesters, phenoxy resins, phenolic resins, acrylic polymers, acrylic block copolymers, acrylic polymers having tertiaryalkyl amide functionality, polysiloxane polymers, polystyrene copolymers, polyvinyl polymers, divinylbenzene copolymers, polyetheramides, polyvinyl acetals, polyvinyl butyrals, polyvinyl acetols, polyvinyl alcohols, polyvinyl acetates, polyvinyl chlorides, methylene polyvinyl ethers, cellulose acetates, styrene acrylonitriles, amorphous polyolefins, thermoplastic urethanes, polyacrylonitriles, ethylene vinyl acetate copolymers, ethylene vinyl acetate terpolymers, functional ethylene vinyl acetates, ethylene acrylate copolymers, ethylene acrylate terpolymers, ethylene butadiene copolymers, ethylene butadiene block copolymers, styrene butadiene block copolymers, polycaprolactone, and any combination thereof.

4. The composition of claim 1, further comprising a catalyst selected from the group consisting of triethylamine, tributylamine, dimethylbenzylamine, N-ethyl-, N-methyl-, N-cyclohexylmorpholine, dimethylcyclohexylamine, dimorpholinodiethylether, 2-(dimethylaminoethoxy)-ethanol, 1,4diazabicyclo [2,2,2]octane, 1-azabicyclo [3,3,0]octane, N,N,N',N'-tetramethyl ethylenediamine, N,N,N',N'-tetramethyl butanediamine, N,N,N',N'-tetramethyl hexanel,6-diamine, pentamethyl diethylenetriamine, tetramethyl diaminoethylether, bis-(dimethylaminopropyl)-urea, N,N'-dimethylpiperazine, 1,2-dimethylimidazole, di-(4-N,N-dimethylaminocyclohexyl)-methane, organometallic compounds, and any combination thereof.

5. The composition of claim 1, wherein the at least one polyether polyol has a number average molecular weight of between 400 and 8,000 g/mole.

6. The composition of claim 1, wherein the at least one thermoplastic resin is free of isocyanate moieties and has a number average molecular weight between 8,000 and 100,000 g/mole.

7. The composition of claim 1, wherein the polyurethane hot melt adhesive composition exhibits a tensile strength of between about 3.0 MPa and about 8.0 MPa.

8. The composition of claim 1, wherein the liquid polyester polyol has a glass transition temperature of no greater than 0° C.

9. A cured reaction product comprising the polyurethane hot melt adhesive composition of claim 1.

10. An electronic device comprising the polyurethane hot melt adhesive composition of claim 1.

11. A method for preparing the polyurethane hot melt adhesive composition of claim 1, the method comprising:
  (i) mixing the polyol component, the at least one thermoplastic resin, and the calcium carbonate under a nitrogen atmosphere at a temperature between about 130 and 150° C.;
  (ii) placing the mixture of step (i) under vacuum;
  (iii) decreasing the temperature to between about 80 and 120° C.;
  (iv) adding the at least one polyisocyanate;
  (v) maintaining the temperature between about 100 and 120° C.;
  (vi) optionally adding a catalyst and one or more additional additives;

(vii) mixing to obtain a homogeneous mixture; and
  (viii) discharging the mixture of step (vii) under a nitrogen atmosphere at a temperature between about 100 and 150° C.

12. A method of forming an article, the method comprising:
  heating the polyurethane hot melt adhesive composition of claim 1 to a molten state;
  dispensing the molten polyurethane hot melt adhesive composition as an adhesive bond line on a first substrate, wherein the dispensed bond line has an aspect ratio greater than 50%; and
  disposing a second substrate over the first substrate and in contact with the adhesive bond line to form the article.

13. The method of claim 12, further comprising cooling the adhesive bond line after disposing the second substrate over the first substrate and in contact with the adhesive bond line.

14. The method of claim 12, further comprising curing the adhesive bond line after disposing the second substrate over the first substrate and in contact with the adhesive bond line.

15. The method of claim 12, wherein the article is a bezel-less device.

16. The method of claim 12, wherein the article is an electronic device.

17. The method of claim 12, wherein the bond line aspect ratio is between about 55% and about 98%.

18. A polyurethane hot melt adhesive composition, comprising, based on the total weight of the composition:
  (A) a polyurethane prepolymer obtained by reacting:
    (A1) a polyol component consisting of:
      (a) from 15 wt. % to 20 wt. % of a crystalline polyol,
      (b) from 15 wt. % to 25 wt. % of a liquid polyester polyol, and
      (c) from 15 wt. % to 40 wt. % of a polyether polyol; and
    (A2) from 10 wt. % to 20 wt. % of at least one polyisocyanate having at least two isocyanate groups in one molecule;
  (B) from 5 wt. % to 20 wt. % of at least one thermoplastic resin;
  (C) from 0.01 wt. % to 3 wt. % of an aspect ratio promoter comprising calcium carbonate; and
  (D) from 0.05 wt. % to 1 wt. % of a catalyst.

* * * * *